P. GNATZIG.
WHEELBARROW.
APPLICATION FILED MAY 7, 1913.
1,103,759.
Patented July 14, 1914.
2 SHEETS—SHEET 1.
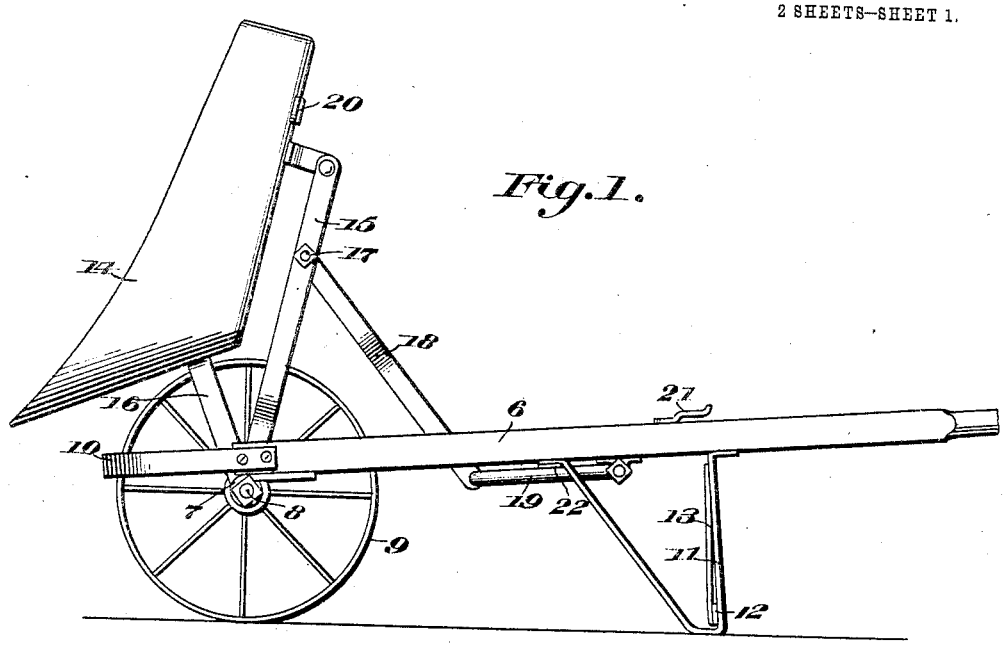
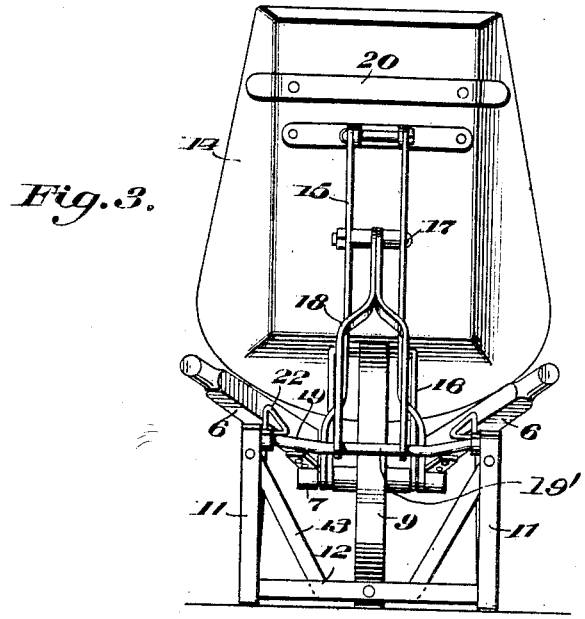
Witnesses
Inventor
Paul Gnatzig
By Victor J. Evans
Attorney

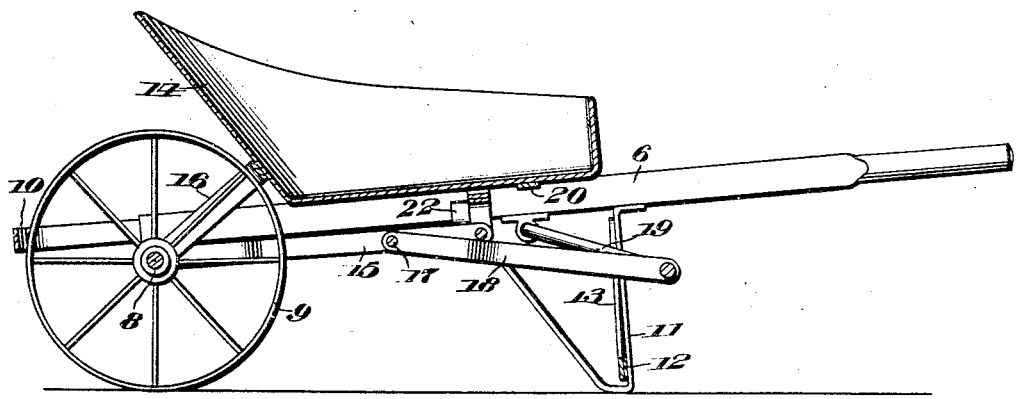
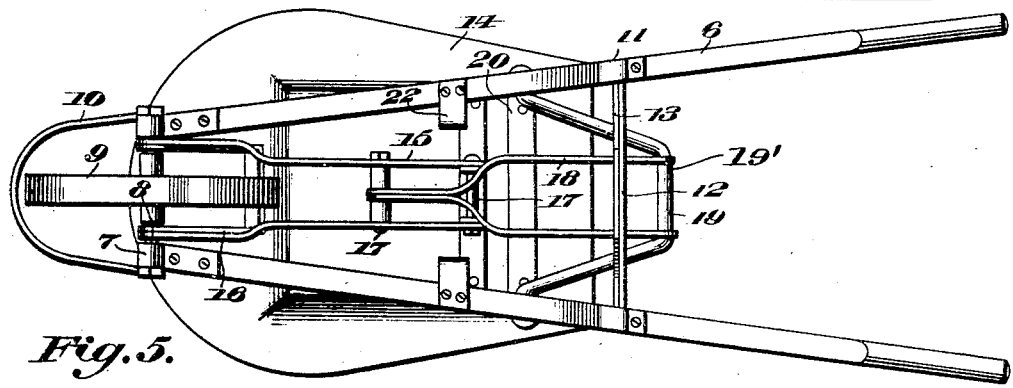
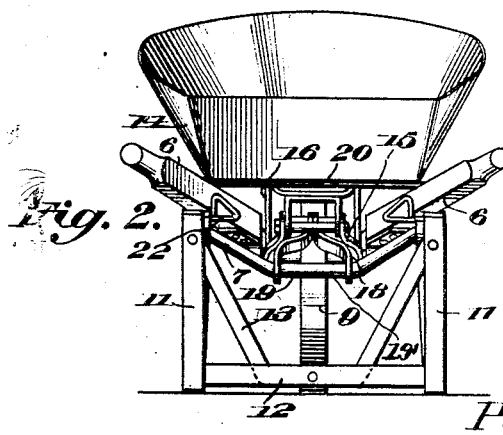

UNITED STATES PATENT OFFICE.

PAUL GNATZIG, OF MADISON, WISCONSIN.

WHEELBARROW.

1,103,759.  Specification of Letters Patent.  Patented July 14, 1914.

Application filed May 7, 1913. Serial No. 766,187.

*To all whom it may concern:*

Be it known that I, PAUL GNATZIG, a citizen of the United States, residing at Madison, in the county of Dane and State of Wisconsin, have invented new and useful Improvements in Wheelbarrows, of which the following is a specification.

This invention relates to wheel barrows, and it has particular reference to that type of wheel barrows which are provided with a tiltably supported scoop or body, the contents of which may be discharged by tilting or upending the same.

The invention has for its object to simplify and improve the general construction and to produce a tilting wheel barrow in which the body may be tilted longitudinally of the frame to discharge its contents in a forward direction over the wheel in plain sight of the operator.

A further object of the invention is to produce a simple and improved construction whereby the tiltable body may be actuated by the foot of the operator without letting go of the handles of the wheel barrow; pressure of the foot being utilized to move the body to and from a discharging position.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a side elevation, showing the improved wheel barrow in discharging position. Fig. 2 is a rear view, showing the wheel barrow in load receiving position. Fig. 3 is a rear elevation, showing the wheel barrow in discharging position. Fig. 4 is a longitudinal sectional view, showing the wheel barrow in load receiving position. Fig. 5 is a bottom plan view, showing the wheel barrow in load receiving position.

Corresponding parts in the several figures are denoted by like characters of reference.

The frame of the improved wheel barrow includes the side members 6, 6 which diverge rearwardly to form the customary handles and which are provided near their front ends with bearings 7 for the axle 8 carrying the supporting wheel 9. The front ends of the side members are connected together by the wheel guard 10. The side members carry the depending leg members 11 which are connected together by a cross bar 12 reinforced by braces 13.

The scoop which constitutes the body 14 of the improved wheel barrow may be of any appropriate shape and dimensions, and said scoop is provided on the underside thereof with a bracket comprising front members 15 and rear members 16, said rear members extending convergently in a forward direction, and said rear members being terminally pivoted upon the axle 8 between the hub of the wheel 9 and the boxes or bearing members 7. The rear bracket members 15 extend rearwardly beneath the body 14 and are connected together by means of a bolt 17 on which the upper end of a link member 18 is pivoted, said link member being bifurcated and the lower ends of the side members thereof being pivoted on a yoke or crank 19, the limbs of said yoke or crank being terminally pivoted upon the side members 6. The bridge portion of the yoke or crank 19 constitutes a foot piece or treadle 19' adjacent to the end of which the lower ends of the side members of the bifurcated link member 18 are pivoted, enabling the foot of the operator to be placed on the foot piece 19'. The body 14 is provided near its rear end with a cross bar 20, the ends of which rest on the side members 6 when the body is in load receiving position. When the body is in load receiving position, the lower end of the yoke or crank 19 extends rearwardly between the braces 13 in such position as to be within convenient reach of one foot of the operator. The side members 6 of the frame are provided with pivoted latch members or turn buttons 21 which may be disposed in the path of the ends of the cross bar 20, thereby locking the body of the wheel barrow against tilting movement. The side members 6 are also provided with inwardly extending stop members 22 that lie in the path of the side members of the yoke or crank 19 for the purpose of limiting the movement of the latter in a forward direction.

The improved wheel barrow is adapted to be handled in the customary manner, and the body 14 may be easily filled or loaded while it is supported in an approximately horizontal position with the ends of the cross bar 20 resting on the side members 6. The body may be secured in this position by means of the latch members or turn buttons 21, and the device may then be used after the fashion of an ordinary wheel barrow. When the latch members 21 are turned to a non-engaging position with respect to the ends of the cross bar 20, the wheel barrow may be unloaded by tilting the body or scoop thereof, said tilting being effected by the operator placing one foot in the bight of the yoke or crank 19 and pushing in a downward and forward direction, when the action of the link 18 will lift or elevate the forward end of the body, tilting the same about the axis of the axle 8 which pivotally supports the bracket arms on the underside of the body. It will be seen that said bracket arms are of sufficient length to swing the scoop or body over the wheel, and the load may thus be actually discharged in an upward direction, that is to say, on the side of an incline. This operation may be effected without letting go of the handles, and it gives the operator absolute control of the device which, as will be seen, is very simple in construction and of such a nature that it will possess great strength and durability.

Having thus described the invention, what is claimed as new, is:—

1. In a wheel barrow, the combination with a supporting frame having a wheel carrying axle, of a body having a downwardly and forwardly extending bracket member pivotally engaging the axle, and tilting means including a yoke pivoted on the frame and having a bridge portion forming a treadle, and a bifurcated link connecting said yoke with the bracket member, the side members of the link being terminally pivoted on the bridge portion of the yoke adjacent to the ends of said bridge portion.

2. In a wheel barrow, the combination with a frame having a wheel carrying axle, of a body having a bracket member pivoted on the axle, a yoke pivoted on the axle and having a bridge portion constituting a treadle, a link connecting said yoke with the bracket member, and stop members connected with the sides of the frame and lying in the path of the yoke.

3. In a wheel barrow, the combination with a frame having handles and a wheel carrying axle, of a pivotally supported body, and tilting means for said body including a yoke having a treadle portion and a link connecting said yoke with the pivotally supported body whereby the latter may be tilted and its contents discharged without letting go of the handles.

In testimony whereof I affix my signature in presence of two witnesses.

PAUL GNATZIG.

Witnesses:
A. C. HOPPMANN,
WILLIAM KNABECK.